(No Model.)
J. L. EASLEY.
LEMON SQUEEZER.
No. 533,584. Patented Feb. 5, 1895.
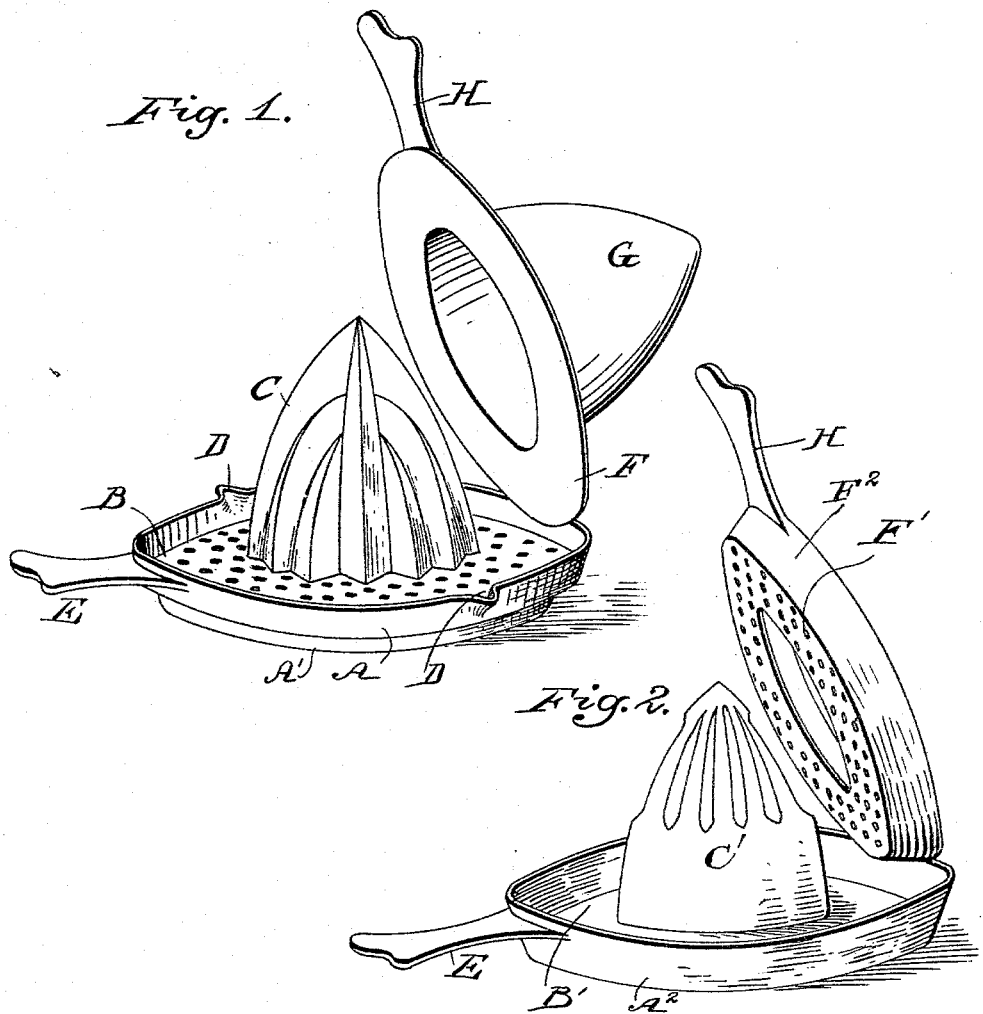
WITNESSES:
INVENTOR
John L. Easley
BY Edgar Tate & Co.
ATTORNEYS

UNITED STATES PATENT OFFICE.

JOHN L. EASLEY, OF NEW YORK, N. Y.

LEMON-SQUEEZER.

SPECIFICATION forming part of Letters Patent No. 533,584, dated February 5, 1895.

Application filed March 29, 1894. Serial No. 505,630. (No model.)

*To all whom it may concern:*

Be it known that I, JOHN L. EASLEY, of the city of New York, in the county and State of New York, have invented certain new and useful Improvements in Lemon-Juice Extractors, of which the following is a full, clear, and exact specification.

This invention relates to that class of devices for extracting the juice of lemons which have a sharp cone-shaped central body upon which the half-section of a lemon is impaled, and rotated to extract the juice, and remove the pulp therefrom.

The object of the invention is to provide means whereby the juice of the lemon may be extracted from the pulp thereof in order that the full measure and value of each lemon may be secured; and the invention consists in the novel construction and arrangement of parts hereinafter fully described and particularly set forth.

In the accompanying drawings, forming a part of this specification, in which like letters of reference designate corresponding parts in all the views:—Figure 1 is a perspective view of a device embodying my invention. Fig. 2 is a similar view of a form slightly varying from that shown in Fig. 1.

Referring now particulary to Fig. 1 of the drawings, in the practice of my invention I employ a dish-shaped base portion A having the slightly contracted lower portion A'. Within the base portion A and resting upon the contracted portion A', is arranged, a perforated strainer plate B supporting a cone shaped pulp-extracting body C which may be of the usual or any preferred construction. The dish-shaped base portion has lips D at each side thereof and is provided preferably with a handle E. To the base portion A, and preferably at the side opposite to the handle E is hinged a plate F having a central opening of a size to receive snugly the body C when the said plate is swung to lie against the plate B. A dome-shaped hollow body G is mounted upon the plate F and over the opening therein to cover the cone-shaped body C during the operation of the device. This plate F is shown as provided with an operating handle H.

The device having been first placed upon a suitable supporting receptacle, the plate F is raised or removed and the half-section of a lemon is placed upon the body C and is turned around upon it whereby the juice of the lemon is extracted and the pulp is removed, the juice passing through the strainer B into the bottom of the said receptacle, the pulp remaining upon the top of the strainer. The plate F is then brought down and into the base portion A and against the pulp on the strainer plate B and by pressing the plate F such juice as remains in the pulp is extracted and passes through the strainer and into the supporting receptacle. The device is then tilted and the juice which may be on the strainer plate is poured off through either of the lips D.

The dome G on the plate F will prevent the juice from passing between the body C and the interior edge of the said plate as would happen were the said dome absent. I do not however limit myself to the use of the dome G as it may be dispensed with as is shown in the other figure of the drawings.

Any juice which would fail to pass through the strainer when the plate is brought down upon the pulp thereon will escape through a lip D when the juice is poured off.

Referring now to Fig. 2 of the drawings:— in place of providing the body portion A with the strainer plate B, as is shown in Fig. 1 of the drawings, the body C' may be mounted directly on the bottom thereof and the perforated plate F' may have an upwardly projecting flange $F^2$ to render it dish-shaped. The usual central opening is left in the plate F' in order that the device may be operated as before stated. In this form, when the lemon is pressed upon the extractor, the juice and pulp will remain in the body portion $A^2$ and the plate being pressed down, the juice will pass through the perforations therein and will rise above the plate, when it may be poured off. As the plate F' fits snugly within the body portion $A^2$ nothing but the dry pulp and seeds will remain therebetween.

I do not desire to limit myself to the position of the strainer plate either above the bottom of the base portion as is shown in Fig. 1 or in any other position as it may be done away with entirely and a combined strainer and presser plate used.

I do not desire to be understood as limiting myself to any one of the forms herein shown nor to the particular constructions set forth. In particular the use of the conical dome G upon the plate F is optional, as is also the hinging of the said plate to the base portion. It may be desirable to omit the handle H and the hinge and instead to grasp the plate by its dome and extract the juice by simply pressing the plate upon the pulp.

Having thus fully described my invention, what I claim is—

1. A lemon juice extractor comprising a base portion, a pulp-extracting body arranged therein, a pressure receiving surface surrounding the said body and a second surface arranged to exert pressure against the said pressure receiving surface only.

2. A device of the class described comprising a base portion, a pulp-extracting body located therein, a perforated surface surrounding said body, an imperforate surface also surrounding said body, and means for establishing pressure between said surfaces only.

3. A lemon juice extractor comprising a base portion, a conical body arranged therein, a strainer plate within the base portion and surrounding the said body, and a second plate arranged to exert pressure against the strainer plate only.

4. A lemon juice extractor comprising a base portion, a pulp-extracting body arranged therein, a plate surrounding the said body and a second plate arranged to exert pressure against the said first plate only.

5. A lemon juice extractor comprising a base portion provided with one or more projecting lips, a pulp-extracting body arranged within the base portion, a strainer plate secured within the base portion and surrounding the said body, a second plate having connections with the base portion and provided with an opening whereby it may be caused to fit over the pulp-extracting body and exert pressure against the strainer plate only, and means for contributing pressure to the said second plate.

6. A lemon juice extractor comprising a base portion, a pulp extracting body arranged therein, a pressure receiving surface surrounding the said body, and a plate arranged to exert pressure against the said surface only, said plate having a dome arranged to cover the pulp-extracting body during the operation of the device.

7. A lemon juice extractor comprising a base portion, a pulp-extracting body arranged therein, a strainer plate secured within the base portion and surrounding the said body, a second plate having connection with the base portion and provided with an opening to receive the pulp-extracting body, and a dome arranged to cover said opening.

In testimony that I claim the foregoing as my invention I have signed my name, in presence of two witnesses, this 27th day of March, 1894.

JOHN L. EASLEY.

Witnesses:
PERCY T. GRIFFITH,
M. LEONARD.